United States Patent
Kanou

(10) Patent No.: US 8,160,510 B2
(45) Date of Patent: Apr. 17, 2012

(54) TRANSMITTER/RECEIVER CIRCUIT AND TRANSMISSION/RECEPTION METHOD

(75) Inventor: Hideto Kanou, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 821 days.

(21) Appl. No.: 12/159,200

(22) PCT Filed: Dec. 27, 2006

(86) PCT No.: PCT/JP2006/326036
§ 371 (c)(1),
(2), (4) Date: Jun. 25, 2008

(87) PCT Pub. No.: WO2007/074863
PCT Pub. Date: Jul. 5, 2007

(65) Prior Publication Data
US 2009/0174622 A1    Jul. 9, 2009

(30) Foreign Application Priority Data
Dec. 27, 2005 (JP) ................................. 2005-376655

(51) Int. Cl.
*H04B 1/44* (2006.01)
(52) U.S. Cl. ............ 455/78; 455/73; 455/130; 455/133; 455/168.1
(58) Field of Classification Search ............ 455/73, 455/78, 552.1, 522, 69, 501, 63.1, 63.4, 562.1, 455/575.7, 101, 130, 132, 133, 168.1
See application file for complete search history.

(56) References Cited

U.S. PATENT DOCUMENTS
4,368,541 A    1/1983 Evans
2002/0180558 A1*  12/2002 Atokawa et al. ............ 333/132
2004/0102172 A1*  5/2004 Hendin ........................ 455/302
2005/0245207 A1  11/2005 Suzuki et al.
2006/0135071 A1*  6/2006 Kim ............................. 455/63.1

FOREIGN PATENT DOCUMENTS
CN    1309841 A    8/2001
CN    1694367 A    11/2005
EP    1089446 A1   4/2001
JP    57-045738    3/1982
(Continued)

OTHER PUBLICATIONS

Japanese language office action dated Jul. 27, 2010 and its English language translation for corresponding Japanese application 2005376655 lists the references above.
English translation of Korean office action for corresponding Korean application 1020087018443 lists the reference above.

(Continued)

*Primary Examiner* — Tuan Pham
(74) *Attorney, Agent, or Firm* — DLA Piper LLP (US)

(57) ABSTRACT

There are provided a transmitter/receiver circuit and a transmission/reception method that can reduce the insertion loss of a circuit in a hybrid operation and are suitable for reducing the cost, size, and power consumption. An antenna switch 119 includes attenuation filters 201 to 203 for attenuating the frequency bands corresponding to a plurality of receiving systems, e.g., the frequency band of an 800 MHz band system, the frequency band of a 2 GHz band system, and GPS reception frequency components. These filters 201 to 203 are connected between a primary (main) antenna connection terminal T204 and a first switch group SWG201 through connection switches 204 to 206.

4 Claims, 9 Drawing Sheets

FOREIGN PATENT DOCUMENTS

| | | |
|---|---|---|
| JP | 58061550 U | 4/1983 |
| JP | 01-112382 | 5/1989 |
| JP | 2000059106 A | 2/2000 |
| JP | 2003-152588 | 5/2003 |
| JP | 2005-057642 | 3/2005 |

OTHER PUBLICATIONS

Chinese language office action dated Feb. 24, 2011 and its English language translation for corresponding Chinese application 200680049296 cites the Foreign patent documents above.

* cited by examiner

FIG. 7

| TEMPERATURE [°C] FREQUENCY [MHz] | TRANSMISSION OUTPUT LEVEL THRESHOLD VALUE [dBm] | | |
|---|---|---|---|
| | −20~10 | 10~40 | 40~60 |
| 898~901 | 4.5 | 4.0 | 3.5 |
| 915~918 | 5.0 | 4.5 | 4.0 |
| 918~921 | 5.5 | 5.0 | 4.5 |
| 921~925 | 6.0 | 5.5 | 5.0 |

FREQUENCY/TEMPERATURE TABLE OF
TRANSMISSION OUTPUT LEVEL THRESHOLD VALUE

TRANSMITTER/RECEIVER CIRCUIT AND TRANSMISSION/RECEPTION METHOD

TECHNICAL FIELD

The present invention relates to a transmitter/receiver circuit and a transmission/reception method which can be applied to a plurality of transmission/reception systems having different frequency bands of communication.

BACKGROUND ART

At present, mobile phones and other wireless communication devices come in a plurality of systems based on different standards. For example, in the Japanese mobile phone system, the PDC system, a CDMA system, a PHS system, etc. have spread.

Usually, a wireless communication device is designed for one of these standards, but the frequency band assigned to each system has become tighter along with a recent spread of mobile phones, so devices have being shifting to multi-band and multi-mode specifications.

Further, in order to supply stable, high performance service, devices are being designed for hybrid operation enabling handoff between different frequency bands, change of an operation mode (for example 1x mode and 1xEVDO), etc.

Various communication devices designed for such multi-band and multi-mode specifications are being proposed (see for example Patent Documents 1 and 2).

A dual band wireless communication device disclosed in Patent Document 1 realizes reduction of the size of the circuits. It has a first frequency conversion unit converting a transmission IF signal to a first transmission signal and converting a first reception signal to a reception IF signal and a second frequency conversion unit converting the first transmission signal to a second transmission signal and converting a second reception signal to the first reception signal and operates a switch by a control signal to switch between an 800 MHz band system using the first transmission signal and first reception signal and a 1900 MHz band system using the second transmission signal and second reception signal.

A multi-band antenna switch circuit and a communication device using same disclosed in Patent Document 2 have a first diplexer 1 having a first transmission terminal, a second reception terminal, and a first common terminal, a second diplexer 2 having a second transmission terminal, a first reception terminal, and a second common terminal, and a switch circuit having a first transmission/reception terminal, a second transmission/reception terminal, and an antenna terminal and in which either one of the first transmission/reception terminal and the second transmission/reception terminal is connected to the antenna terminal by switching, wherein the first common terminal is connected to the first transmission/reception terminal, the second common terminal is connected to the second transmission/reception terminal, and a notch filter is provided between the antenna terminal and the switch circuit.

FIG. 1 is a block diagram showing an example of the configuration of a generally known wireless communication device.

The wireless communication device of FIG. 1 is configured by an 800 MHz band CDMA system (for example ARIB STD-T53, hereinafter abbreviated as an "800 MHz band system"), a 2 GHz band system (for example ARIB STD-T64, hereinafter abbreviated as a "2 GHz band system"), and a GPS receiver.

Further, the wireless communication terminal of FIG. 1 is configured as a diversity type for both of the 800 MHz band system and 2 GHz band system in order to improve the through-put or enable a hybrid operation in data communication.

As concrete assigned frequencies, in the 800 MHz band system, the transmission frequencies are 898 to 891 MHz and 915 to 925 MHz and the reception frequencies are 843 to 846 MHz and 860 to 870 MHz, and in the 2 GHz band system, the transmission frequency is 1920 to 1980 MHz, and the reception frequency is 2110 to 2170 MHz. Further, a GPS reception frequency is 1575.42 MHz.

In FIG. 1, the 800 MHz band system includes a power amplifier 1 amplifying a transmission signal up to a predetermined level, a filter 2 for attenuating a frequency component of the 2 GHz band system, a filter 3 for attenuating a GPS reception frequency component, a duplexer 4 for demultiplexing a transmission/reception signal of the 800 MHz band, a low noise amplifier 5 amplifying a reception signal of an 800 MHz band primary receiver circuit with a low noise, a low noise amplifier 12 amplifying a reception signal of an 800 MHz band secondary receiver circuit with a low noise, and an 800 MHz band reception filter 13 for eliminating unnecessary waves.

The 2 GHz band system includes a power amplifier 6 amplifying a transmission signal up to a predetermined level, a filter 7 for attenuating a frequency component of the 800 MHz band system, a filter 8 for attenuating a GPS reception frequency component, a duplexer 9 for demultiplexing a transmission/reception signal of the 2 GHz band, a low noise amplifier 10 amplifying a reception signal of a 2 GHz band primary receiver circuit with a low noise, a low noise amplifier 14 amplifying a reception signal of a 2 GHz band secondary receiver circuit with a low noise, and a 2 GHz band reception filter 15 for eliminating unnecessary waves.

Further, the GPS reception system includes a low noise amplifier 16 amplifying a GPS reception signal with a low noise and a GPS reception frequency band reception filter 17 for eliminating unnecessary waves.

Furthermore, the wireless communication device of FIG. 1 is configured by a primary (main) antenna 21, a measurement use connector 22, a secondary (sub) antenna 23, an antenna switch 11 for enabling the primary (main) antenna 21 and measurement use connector 22 to be shared by both systems of the 800 MHz band and 2 GHz band, and a triplexer 18 for enabling the secondary (sub) antenna 23 to be shared by the 800 MHz band secondary receiver circuit, 2 GHz band secondary receiver circuit, and GPS receiver circuit.

FIG. 2 is a diagram showing an example of the circuit of the antenna switch 11 of FIG. 1.

The antenna switch 11 of FIG. 2 has an 800 MHz band signal use input/output terminal T1, a 2 GHz band signal use input/output terminal T2, a control signal use terminal T3, a primary (main) antenna use connection terminal T4, a connection terminal T5 with the measurement use connector 22, switches SW1 to SW8, capacitors C1 to C4, and a control circuit 11A performing on/off control of switches SW1 to SW8.

Patent Document 1: Japanese Patent Publication (A) No. 1-112382
Patent Document 2: Japanese Patent Publication (A) No. 2003-152588

DISCLOSURE OF THE INVENTION

Problem to be Solved by the Invention

In the wireless communication device explained above, however, in the case where operating in the hybrid mode, for example, in the case where the data is received by the secondary receiver circuit of the 2 GHz band system or the GPS receiver circuit simultaneously with call by the primary circuit of the 800 MHz band system, the noise generated in the transmitter circuit of the 800 MHz band system sneaks into the secondary circuit of the 2 GHz band system and the GPS receiver circuit having different frequencies from the frequency of the 800 MHz band system and degrades the reception sensitivity.

For this reason, it was necessary to provide the transmitter circuit of the 800 MHz band system with the filter 2 for attenuating the frequency component of the 2 GHz band system and the filter 3 for attenuating the GPS reception frequency component.

Further, in the same way, in a case where the data is received at the secondary receiver circuit of the 800 MHz band system or the GPS receiver circuit simultaneously with call by the primary circuit of the 2 GHz band system, the noise generated in the transmitter circuit of the 2 GHz band system sneaks into the secondary circuit of the 800 MHz band and the GPS receiver circuit having different frequencies from the frequency of the 2 GHz band system and degrades the reception sensitivity.

For this reason, it is necessary to provide the transmitter circuit of the 2 GHz band system with the filter 7 for attenuating the frequency component of the 800 MHz band system and the filter 8 for attenuating the GPS reception frequency component, therefore there are the disadvantages that the wireless communication device becomes expensive and, at the same time, the power consumption increases due to increases of the volume and mass and an increase of the insertion loss of the circuit.

The present invention provides a transmitter/receiver circuit and a transmission/reception method able to reduce the insertion loss of a circuit at the time of a hybrid operation and suitable for reduction of the price, reduction of the size, and reduction of the power consumption.

Means For Solving The Problem

A transmitter/receiver circuit of a first aspect of the present invention has a main antenna, a sub antenna, a plurality of transmission/reception systems having different frequency bands connected to the main antenna via a changeover switch, a plurality of reception systems having different frequency bands connected to the sub antenna, a plurality of attenuation filters connected to the transmission/reception systems via a connection switch and attenuating a plurality of frequency bands corresponding to the plurality of reception systems, and a controlling means for controlling the connection or disconnection of the plurality of attenuation filters to the transmission/reception systems by controlling the connection switch on/off in accordance with the frequency band received at the sub antenna.

Preferably, the plurality of attenuation filters are connected to transmitter circuits of the plurality of transmission/reception systems via the connection switch.

Preferably, the plurality of attenuation filters are connected between the main antenna and the changeover switch via the connection switch.

Preferably, the controlling means connects the attenuation filter attenuating the frequency band received at the sub antenna to the transmission/reception system in accordance with a transmission power of the main antenna.

Preferably, the controlling means connects the attenuation filter attenuating the frequency band received at the sub antenna to the transmission/reception system in accordance with a reception power of the main antenna.

Preferably, the controlling means measures a transmission noise generated in the transmission/reception system and connects the attenuation filter attenuating the frequency band received at the sub antenna to the transmission/reception system based on a value of the measured transmission noise.

A second aspect of the present invention is a method for transmitting/receiving a plurality of signals having different frequency bands by using a main antenna capable of transmitting/receiving a plurality of signals having different frequency band and a sub antenna capable of receiving a plurality of signals having different frequency bands, the method including a first step of judging whether or not an operation mode is a hybrid mode of transmitting/receiving signals of two different frequency bands by using the main antenna and the sub antenna, and a second step of selecting and attenuating the frequency band of the signal received at the sub antenna in a transmission signal output from the main antenna.

EFFECTS OF THE INVENTION

According to the present invention, a transmitter/receiver circuit and a transmission/reception method able to reduce the insertion loss of a circuit at the time of a hybrid operation of a wireless communication device and suitable for reduction of the price, reduction of the size, and reduction of the power consumption can be provided.

BRIEF DESCRIPTION OF THE DRAWINGS

FIG. 7 is a diagram showing an example of a frequency/temperature table.

DESCRIPTION OF NOTATIONS

100 . . . wireless communication device, 110 . . . main transmission/reception system, 111 . . . power amplifier, 112 . . . duplexer, 113 . . . low noise amplifier, 114 . . . power amplifier, 115 . . . duplexer, 116 . . . low noise amplifier, 117 . . . primary (main) antenna, 118 . . . measurement use connector, 119 . . . antenna switch, 120 . . . sub reception system, 121 . . . low noise amplifier, 122 . . . reception filter, 123 . . . low noise amplifier, 124 . . . reception filter, 125 . . . low noise amplifier, 126 . . . reception filter, 127 . . . secondary (sub) antenna, 128 . . . triplexer, T201 . . . 800 MHz band signal use input/output terminal, T202 . . . 2 GHz band signal use input/output terminal, T203 . . . control signal use terminal, T204 . . . primary (main) antenna use connection terminal, T205 . . . connection terminal, SWG201 . . . first switch (group), SW201 to SW208 . . . switches, C201 to C204 . . . capacitors, 201 to 203 . . . attenuation filters, 204 to 206 . . . connection switches, and 207 . . . control circuit.

BEST MODE FOR CARRYING OUT THE INVENTION

Below, an embodiment of the present invention will be explained with reference to the drawings.

Figure 3:
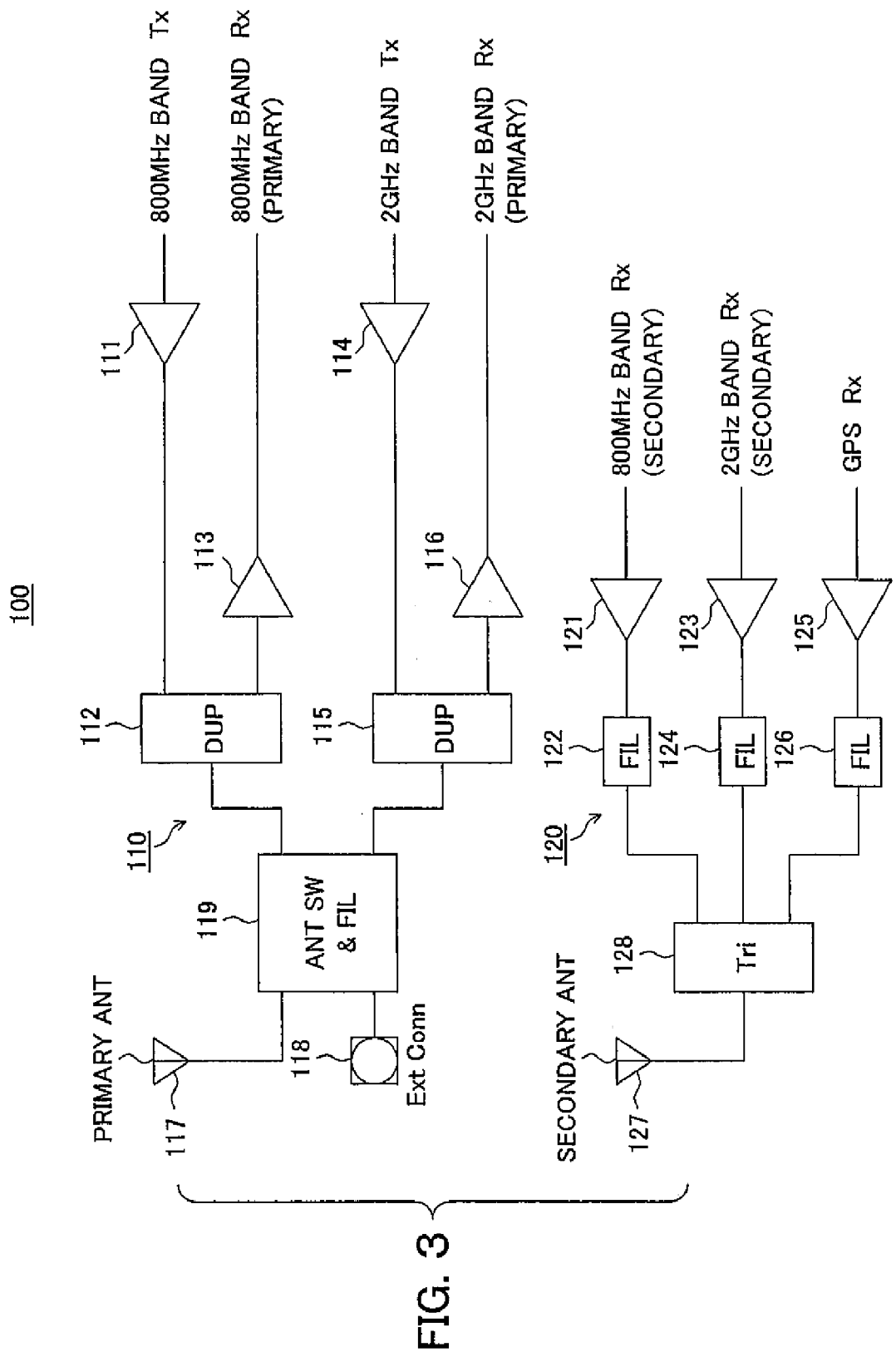
FIG. 3 is a block diagram showing an example of the configuration of a wireless communication device employing a multi-band transmitter/receiver circuit according to an embodiment of the present invention.

FIG. 3 is a block diagram showing an example of the configuration of a wireless communication device employing a transmitter/receiver circuit according to an embodiment of the present invention.

The present wireless communication device 100 has a main transmission/reception system 110 performing primary transmission/reception and a sub reception system 120 performing secondary reception.

The main transmission/reception system 110, in FIG. 3, includes an 800 MHz band system formed by a power amplifier 111 amplifying a transmission signal up to a predetermined level, a duplexer 112 for demultiplexing a transmission/reception signal of the 800 MHz band, and a low noise amplifier 113 amplifying a reception signal of the 800 MHz band primary reception with a low noise, a 2 GHz band system formed by a power amplifier 114 amplifying a transmission signal up to a predetermined level, a duplexer 115 for demultiplexing the transmission/reception signal of the 2 GHz band, and a low noise amplifier 116 amplifying a reception signal of the 2 GHz band primary reception with a low noise, a primary (main) antenna 117, a measurement use connector 118, and an antenna switch 119 for enabling the primary (main) antenna 117 and the measurement use connector 118 to be shared by both systems of the 800 MHz band and the 2 GHz band.

The sub reception system 120, in FIG. 3, includes an 800 MHz band system formed by a low noise amplifier 121 amplifying a reception signal of the 800 MHz band secondary reception with a low noise and an 800 MHz band reception filter 122 for eliminating unnecessary waves, a 2 GHz band system formed by a low noise amplifier 123 amplifying a reception signal of the 2 GHz band secondary receiver circuit with a low noise and a 2 GHz band reception filter 124 for eliminating unnecessary waves, a GPS reception system formed by a low noise amplifier 125 amplifying a GPS reception signal with a low noise and a GPS reception frequency band reception filter 126 for eliminating unnecessary waves, a secondary (sub) antenna 127, and a triplexer 128 for enabling the secondary (sub) antenna 127 to be shared by the 800 MHz band secondary receiver circuit, 2 GHz band secondary receiver circuit, and GPS receiver circuit.

The antenna switch 119 of the present embodiment includes a plurality of (three in the present embodiment) attenuation filters attenuating frequency bands corresponding to a plurality of reception systems, i.e., in the present embodiment, the frequency band of the 800 MHz band system, the frequency band of the 2 GHz band system, and the GPS reception frequency component. The plurality of attenuation filters are connected via the connection switch between the primary (main) antenna 117 and the switch group serving as the first switch.

Figure 4:
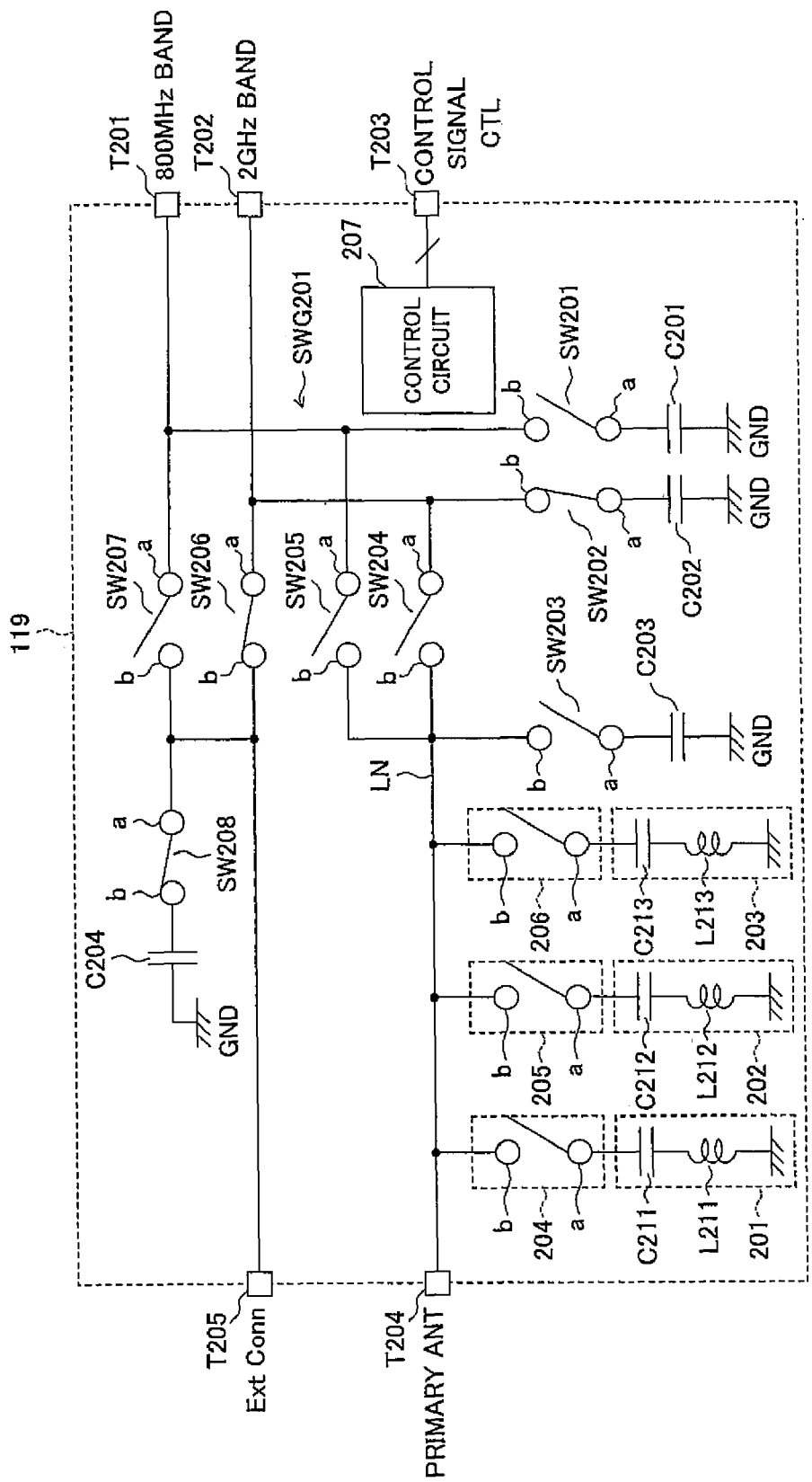
FIG. 4 is a circuit diagram showing a concrete example of the configuration of the antenna switch according to the present embodiment.

FIG. 4 is a circuit diagram showing a concrete example of the configuration of the antenna switch 119 according to the present embodiment.

The antenna switch 119 of FIG. 4 has an 800 MHz band signal use input/output terminal T201 connected to the duplexer 112, a 2 GHz band signal use input/output terminal T202 connected to the duplexer 115, a control signal use terminal T203 connected to a supply line of a control signal CTL, a primary (main) antenna use connection terminal T204 connected to the primary (main) antenna 117, a connection terminal T205 with the measurement use connector 118, switches SW201 to SW208 as a first switch (group) SWG201, capacitors C201 to C204, attenuation filters 201 to 203, connection switches 204 to 206, and a control circuit 207 performing the on/off control of the connection switches 204 to 206 and switches SW201 to SW208.

Further, a line indicated by notation LN in FIG. 4 shows a connection line of the primary (main) antenna 117 use connection terminal T204 and the first switch (group) SWG 201.

The attenuation filter 201 is connected via the connection switch 204 to the connection line LN, the attenuation filter 202 is connected via the connection switch 205 to the connection line LN, and the attenuation filter 203 is connected via the connection switch 206 to the connection line LN.

The first switch (group) SWG201 is connected via the terminals T201 and T202 to the transmitter/receiver circuits of the 800 MHz band system and the 2 GHz band system, therefore the attenuation filters 201 to 203 are connected via the connection switches 204 to 206 and connection line LN to the primary (main) antenna 117 and, at the same time, connected via the connection switches 204 to 206, first switch (group) SWG201, and duplexers 112 and 115 to the transmitter circuits or receiver circuits.

The attenuation filter 201 is a filter for attenuating the frequency component of the 800 MHz band system and is formed by an inductor L211 and a capacitor C211.

One end of the inductor L211 is grounded, the other end is connected to a first electrode of the capacitor C211, and a second electrode of the capacitor C211 is connected to a fixed contact a of the connection switch 204. Further, an operation contact b of the connection switch 204 is connected to the connection line LN.

The attenuation filter 202 is a filter for attenuating the frequency component of the 2 GHz band system and is formed by an inductor L212 and a capacitor C212.

One end of the inductor L212 is grounded, the other end is connected to a first electrode of a capacitor C212, and a second electrode of the capacitor C212 is connected to a fixed contact a of the connection switch 205. Further, an operation contact b of the connection switch 205 is connected to the connection line LN.

The attenuation filter 203 is a filter for attenuating the GPS reception frequency component and is formed by an inductor L213 and a capacitor C213.

One end of the inductor L213 is grounded, the other end is connected to a first electrode of a capacitor C213, and a second electrode of the capacitor C213 is connected to a fixed contact a of a connection switch 206. Further, an operation contact b of the connection switch 206 is connected to the connection line LN.

In the first switch (group) SWG201, the switch SW201 is connected at its fixed contact a to the first electrode of the capacitor C201 and is connected at its operation contact b to the terminal T201. The second electrode of the capacitor C201 is grounded.

The switch SW202 is connected at its fixed contact a to the first electrode of the capacitor C202 and is connected at its operation contact b to the terminal T202. The second electrode of the capacitor C202 is grounded.

The switch SW203 is connected at its fixed contact a to the first electrode of the capacitor C203 and is connected at its operation contact b to the connection line LN (terminal T204). The second electrode of the capacitor C203 is grounded.

The switch SW204 is connected at its fixed contact a to the terminal T202 and is connected at its operation contact b to the connection line LN (terminal T204).

The switch SW205 is connected at its fixed contact a to the terminal T201 and is connected at its operation contact b to the connection line LN (terminal T204).

The switch SW206 is connected at its fixed contact a to the terminal T202 and is connected at its operation contact b to the terminal T205.

The switch SW207 is connected at its fixed contact a to the terminal T201 and is connected at its operation contact b to the terminal T205.

The switch SW208 is connected at its fixed contact a to the terminal T205 and is connected at its operation contact b to the first electrode of the capacitor C204. The second electrode of the capacitor C204 is grounded.

The control circuit 207 controls the switching of the connection switches 204 to 206 and switches SW201 to SW208 in response to the control signal CTL and reduces an insertion loss of the circuit and accordingly reduce a power consumption by disconnecting the attenuation filter 201, attenuation filter 202, and attenuation filter 203 from the connection terminal T204 of the primary (main) antenna 117 according to need.

The control circuit 207 can be configured so as to connect the attenuation filter corresponding to the frequency band during the reception at the secondary (sub) antenna 127 to the transmitter circuit or the primary (main) antenna use connection terminal T204 by the connection switch.

Alternatively, the control circuit 207 can be configured so as to connect the attenuation filter corresponding to the frequency band during the reception at the secondary (sub) antenna 127 to the transmitter circuit or the primary (main) antenna use connection terminal T204 in accordance with the reception power of the primary (main) antenna 117.

Alternatively, the control circuit 207 can be configured so as to connect the attenuation filter corresponding to the frequency band during the reception at the secondary (sub) antenna 127 to the transmitter circuit or the primary (main) antenna use connection terminal T204 in accordance with the transmission power of the primary (main) antenna 117.

The control circuit 207 measures the transmission noise generated in the transmission/reception system in advance and selects and connects the attenuation filter in accordance with the transmission power of the primary (main) antenna 117 based on the measured value.

Figure 5:
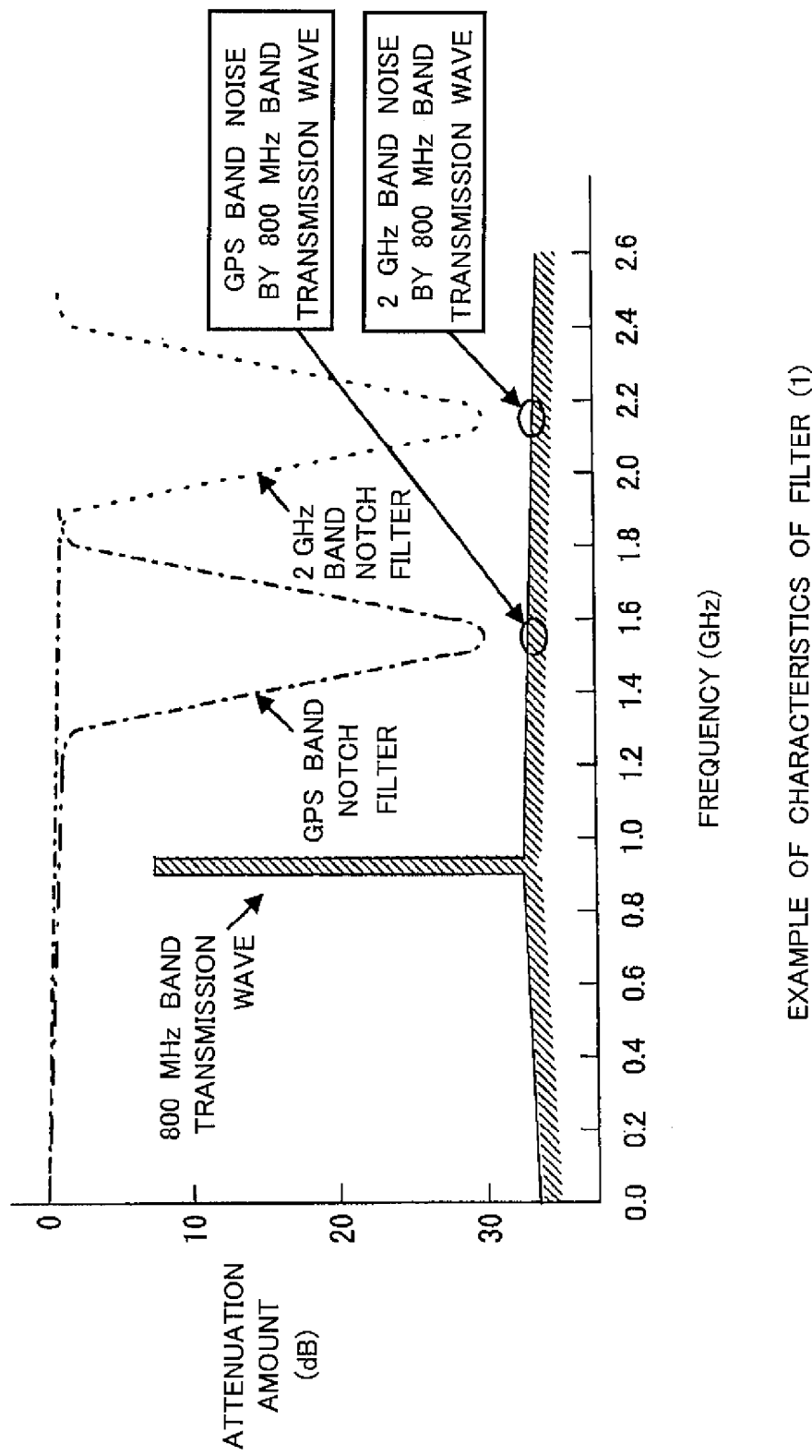
FIG. 5 is a diagram showing a first example of characteristics of an attenuation filter according to the present embodiment.

FIG. 5 is a diagram showing an example of the characteristics of the attenuation filter according to the present embodiment. In FIG. 5, an abscissa shows the frequency, and an ordinate shows the attenuation amount.

For example, in the case where the device is operating in a hybrid mode where other data is received at the secondary receiver circuit of the 2 GHz band system simultaneously with call by the primary circuit of the 800 MHz band system, as shown in FIG. 5, a reception band (2110 to 2170 MHz) component of the 2 GHz band system in the transmission noise generated in the transmitter circuit of the 800 MHz band system sneaks into the secondary receiver circuit of the 2 GHz band system via the antenna or due to the influence of isolation of the parts and the board etc. and degrades the reception sensitivity of the secondary receiver circuit of the 2 GHz band system.

For this reason, it is necessary to select the attenuation filter 202 for attenuating the frequency component of the 2 GHz band system to ensure a sufficient attenuation amount in the reception band (2110 to 2170 MHz) of the 2 GHz band system.

Assuming that a reception band (2110 to 2170 MHz) noise of the 2 GHz band system generated in the power amplifier 111 of the 800 MHz band system is −135 dBm/Hz, the attenuation amount in the reception band (2110 to 2170 MHz) of the duplexer 112 is 15 dB, the insertion loss of the antenna switch 119 is 0.5 dB, the attenuation amount in the reception band (2110 to 2170 MHz) of the 2 GHz band system of the attenuation filter 202 for attenuating the frequency component of the 2 GHz band system is 20 dB, the isolation between the primary (main) antenna 117 and the secondary (sub) antenna 127 is 10 dB, the attenuation amount in the reception band (2110 to 2170 MHz) of the triplexer is 0.5 dB, and the attenuation amount in the reception band (2110 to 2170 MHz) of the 2 GHz band reception filter 124 is 3 dB, the noise amount N in the reception band (2110 to 2170 MHz) at the input end of the low noise amplifier 123 is given by the following equation:

$$N=-135-15-0.5-20-10-0.5-3=-184 \text{ [dBm/Hz]} \quad \text{(Equation 1)}$$

This value becomes a value lower than a thermal noise=−174 [dBm/Hz] by 10 dB and does not exert an influence upon the reception sensitivity.

If the attenuation filter 202 for attenuating the frequency component of the 2 GHz band system is deleted, the noise amount N of the reception band (2110 to 2170 MHz) at the input end of the low noise amplifier 123 is given by the following equation:

$$N=-135-15-0.5-10-0.5-3=-164 \text{ [dBm/Hz]} \quad \text{(Equation 2)}$$

This value is a value higher than the thermal noise=−174 [dBm/Hz] by 10 dB, so degrades the reception sensitivity by about 10 dB.

The antenna switch 119 in the wireless communication device 100 of the present embodiment can keep the noise from sneaking into the secondary receiver circuit of the 2 GHz band system by providing the attenuation filter 202 for attenuating the frequency component of the 2 GHz band system.

Note that, in the above-described mode, the functions of the attenuation filter 201 for attenuating the frequency component of the 800 MHz band system and the attenuation filter 203 for attenuating the GPS reception frequency component are not needed. Therefore, by disconnecting the attenuation filter 201 and the attenuation filter 203 from the primary (main) antenna use connection terminal T204 of the antenna switch 119 by holding the connection switch 204 and the connection switch 206 in an off state under the control of the control circuit 207, the insertion loss of the circuit is reduced and accordingly the power consumption is reduced.

Further, the transmission noise generated in the transmitter circuit of the 800 MHz band system fluctuates according to the transmission output power. For example, in the case of the CDMA system, the larger the reception power, the smaller the transmission output power. Due to this, the transmission noise generated in the transmitter circuit of the 800 MHz band system is reduced as well.

As a result, the transmission noise sneaking into the secondary receiver circuit of the 2 GHz band system is reduced as well, and the sensitivity deterioration is eliminated.

Namely, the necessity of providing the attenuation filter 202 attenuating the frequency component of the 2 GHz band system is lost.

Considering the above, when a certain constant level or higher reception power is input or when a reception C/N becomes a certain constant level (threshold value) or more, the connection switch 205 is held in the off state under the control of the control circuit 207 and the attenuation filter 202 attenuating the frequency component of the 2 GHz band system is disconnected from the primary (main) antenna use connection terminal T204 of the antenna switch 119 to reduce the insertion loss of the primary circuit of the 800 MHz band system and accordingly reduce the power consumption.

Figure 6:
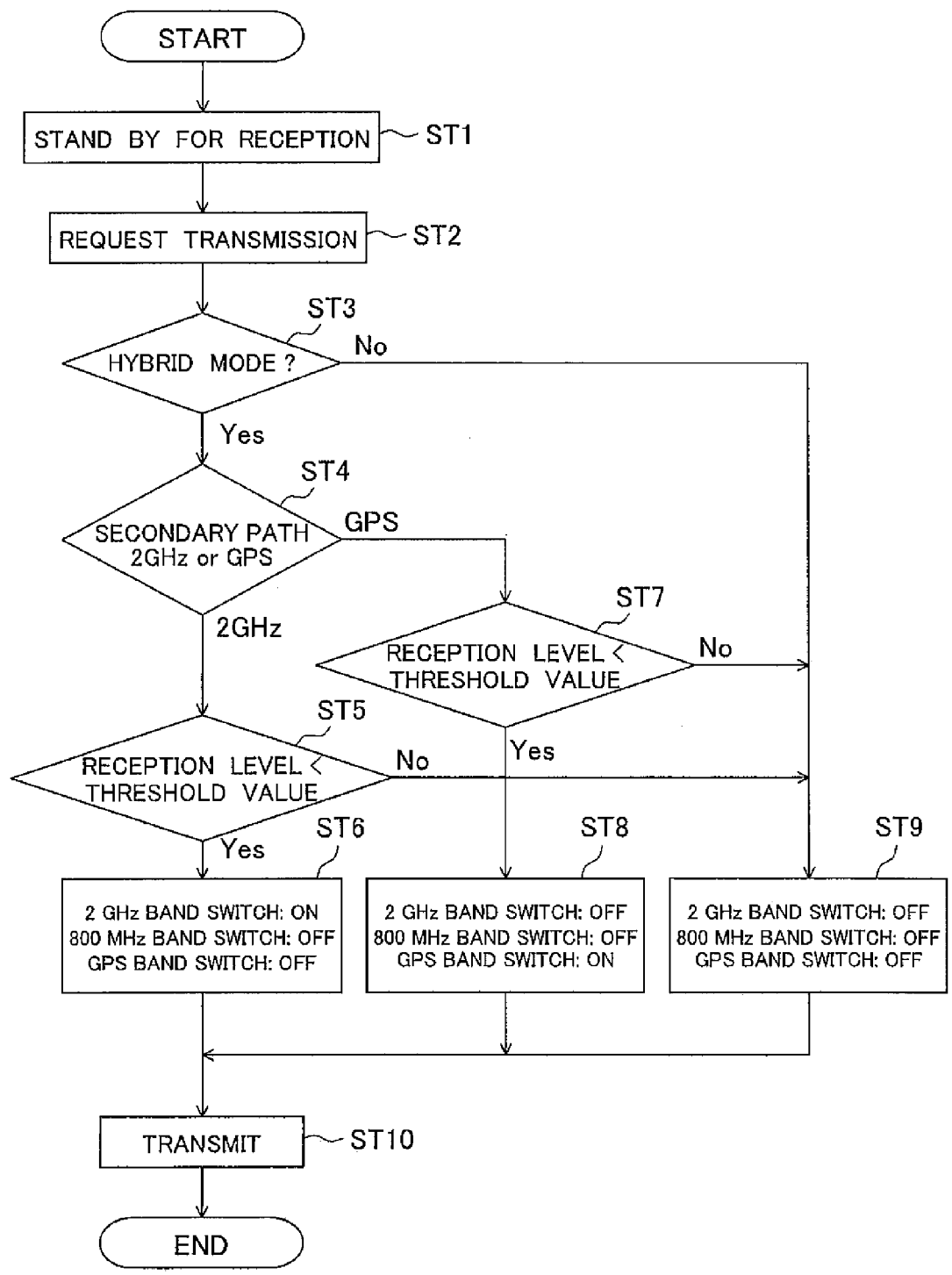
FIG. 6 is a flow chart showing a first filter selection control operation comparing a reception level and a threshold value.

FIG. 6 is a flow chart showing a first filter selection control operation comparing the reception level and the threshold value.

As shown in FIG. 6, when there is a transmission request while standing by for reception (ST1, ST2), the wireless communication device 100 judges whether or not the operation mode is the hybrid mode (ST3).

When judging the mode is the hybrid mode at step ST3, the wireless communication device 100 judges next whether the reception frequency at the secondary receiver circuit (sub reception system 120) is the 2 GHz band or GPS reception frequency band (ST4).

When judging the frequency to be the 2 GHz band at step ST4, the wireless communication device 100 judges whether or not the reception level is lower than a threshold value set in advance (ST5).

When it is judged at step ST5 that the reception level is lower than the threshold value, the control circuit 207 turns on the connection switch 204 to which the attenuation filter 202 attenuating the frequency component of the 2 GHz band is connected, turns off the connection switch 204 to which the attenuation filter 201 attenuating the frequency component of the 800 MHz band is connected, and turns off the connection switch 206 to which the attenuation filter 203 attenuating the GPS reception frequency component is connected.

When judging the frequency to be the GPS reception frequency band at step ST4, the wireless communication device 100 judges whether or not the reception level is lower than a threshold value set in advance (ST7).

When it is judged at step ST7 that the reception level is lower than the threshold value, the control circuit 207 turns off the connection switch 205 to which the attenuation filter 202 attenuating the frequency component of the 2 GHz band is connected, turns off the connection switch 204 to which the attenuation filter 201 attenuating the frequency component of the 800 MHz band is connected, and turns on the connection switch 206 to which the attenuation filter 203 attenuating the GPS reception frequency component is connected (ST8).

Further, at steps ST3 and ST5 or ST7, when a negative judgment result is obtained, the control circuit 207 turns off the connection switch 205 to which the attenuation filter 202 attenuating the frequency component of the 2 GHz band is connected, turns off the connection switch 204 to which the attenuation filter 201 attenuating the frequency component of the 800 MHz band is connected, and turns off the connection switch 206 to which the attenuation filter 203 attenuating the GPS reception frequency component is connected (ST9).

After performing the above switch control, the wireless communication device 100 performs the transmission (ST10).

Further, the technique of controlling the connection switch 205 is not limited to the reception power level and reception C/N. A method using the transmission output power level exists as well.

Namely, when the transmission output power becomes a certain constant level or less, by setting the switch 205 to the off state under the control of the control circuit 207 and disconnecting the attenuation filter 202 attenuating the frequency component of the 2 GHz band system from the primary (main) antenna use connection terminal T204 of the antenna switch 119, the insertion loss of the primary circuit of the 800 MHz band system is reduced and accordingly the power consumption is reduced.

Further, it is also possible to employ a method of measuring in advance the amount of the transmission noise generated in the transmission circuit by the secondary receiver circuit of the 2 GHz band system, determining the transmission output level threshold value turning on/off the connection switch 205 based on the measured value, and turning on/off the connection switch 205 by using this threshold value.

Note that, as shown in FIG. 7, threshold values are listed in a table according to the frequency, temperature, and other conditions.

In the example of FIG. 7, when the temperature is −20° C. to 10° C., the transmission output level threshold value in the 898 MHz to 901 MHz band is set to 4.5 (dB), the threshold value in the 915 MHz to 918 MHz band is set to 5.0 (dB), the threshold value in the 918 MHz to 921 MHz band is set to 5.5 (dB), and the threshold value in the 921 MHz to 925 MHz band is set to 6.0 (dB).

In the same way, when the temperature is 10° C. to 40° C., the transmission output level threshold value in the 898 MHz to 901 MHz band is set to 4.0 (dB), the threshold value in the 915 MHz to 918 MHz band is set to 4.5 (dB), the threshold value in the 918 MHz to 921 MHz band is set to 5.0 (dB), and the threshold value in the 921 MHz to 925 MHz band is set to 5.5 (dB).

When the temperature is 40° C. to 60° C., the transmission output level threshold value in the 898 MHz to 910 MHz band is set to 3.5 (dB), the threshold value in the 915 MHz to 918 MHz band is set to 4.0 (dB), the threshold value in the 918 MHz to 921 MHz band is set to 4.5 (dB), and the threshold value in the 921 MHz to 925 MHz band is set to 5.0 (dB).

Figure 8:
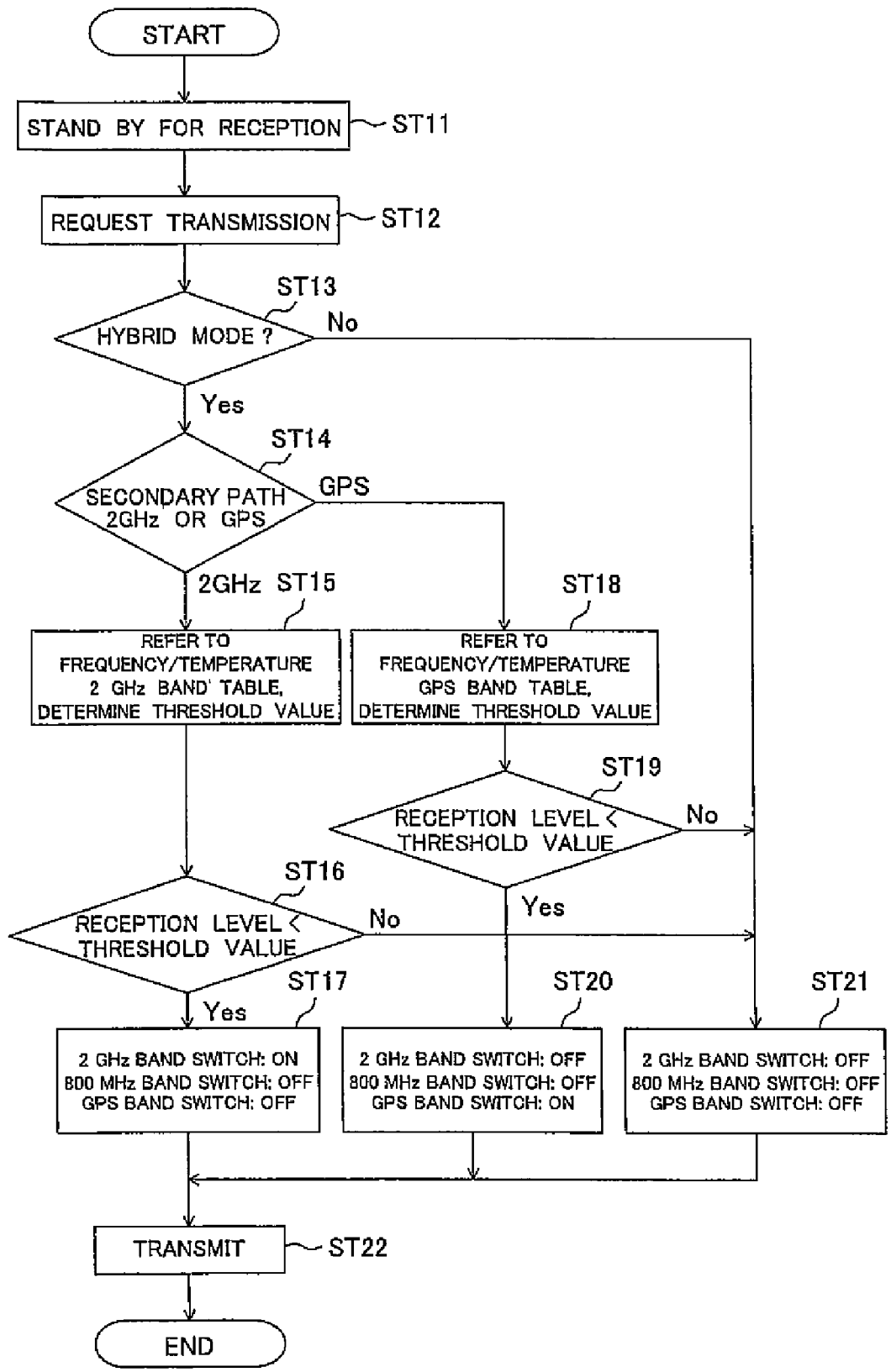
FIG. 8 is a flow chart showing a first filter selection control operation comparing a reception level and a threshold value.

FIG. 8 is a flow chart showing a second filter selection control operation comparing the reception level and the threshold value employing the method of determining the threshold value based on the measured value.

As shown in FIG. 8, when there is a transmission request while standing by for reception (ST11, ST12), the wireless communication device 100 judges whether or not the operation mode is the hybrid mode (ST13).

When judging the mode to be the hybrid mode at step ST3, the wireless communication device 100 judges next whether the reception frequency at the secondary receiver circuit (sub reception system 120) is the 2 GHz band or GPS reception frequency band (ST14).

When judging it to be the 2 GHz band at step ST14, the wireless communication device 100 determines the threshold value by referring to the frequency/temperature 2 GHz band table (ST15) and judges whether or not the transmission level is higher than the determined threshold value (ST16).

When it is judged at step ST16 that the transmission level is higher than the threshold value, the control circuit 207 performs control so as to turn on the connection switch 205 to which the attenuation filter 202 attenuating the frequency component of the 2 GHz band is connected, turn off the connection switch 204 to which the attenuation filter 201 attenuating the frequency component of the 800 MHz band is connected, and turn off the connection switch 206 to which the attenuation filter 203 attenuating the GPS reception frequency component is connected.

When it is judged the frequency is the GPS reception frequency band at step ST14, the wireless communication device 100 determines the threshold value by referring to the frequency/temperature GPS band table (ST18) and judges whether or not the transmission level is higher than the determined threshold value (ST19).

When it is judged at step ST19 that the transmission level is higher than the threshold value, the control circuit 207 turns off the connection switch 205 to which the attenuation filter 202 attenuating the frequency component of the 2 GHz band is connected, turns off the connection switch 204 to which the attenuation filter 201 attenuating the frequency component of the 800 MHz band is connected, and turns on the connection switch 206 to which the attenuation filter 203 attenuating the GPS reception frequency component is connected (ST20).

Further, when a negative judgment result is obtained at steps ST13 and ST16, or ST19, the control circuit 207 turns off the connection switch 205 to which the attenuation filter 202 attenuating the frequency component of the 2 GHz band is connected, turns off the connection switch 204 to which the attenuation filter 201 attenuating the frequency component of the 800 MHz band is connected, and turns off the connection switch 206? to which the attenuation filter 203 attenuating the GPS reception frequency component is connected (ST21).

After performing the above switch control, the wireless communication device 100 performs the transmission (ST22).

Further, the same as the above can be said for the case where the apparatus is operating in a hybrid mode where the data is received at the GPS receiver circuit simultaneously with call by the primary circuit of the 800 MHz band system. The noise can be kept from sneaking into the secondary receiver circuit of the 800 MHz band system by providing the attenuation filter 203 attenuating the GPS reception frequency component.

In this case, by holding the connection switch 204 and the connection switch 205 in the off state under the control of the control circuit 207, the attenuation filter 201 and the attenuation filter 202 are disconnected from the primary (main) antenna use connection terminal T204 of the antenna switch 119, the insertion loss of the circuit is reduced, and accordingly the power consumption is reduced.

Further, when a certain constant level or higher reception power is input, by setting the connection switch 206 to the off state under the control of the control circuit 207 and disconnecting the attenuation filter 203 attenuating the GPS frequency component from the primary (main) antenna use connection terminal T204 of the antenna switch 119, there is an effect of further reducing the insertion loss of the circuit and accordingly reducing the power consumption.

Figure 9:
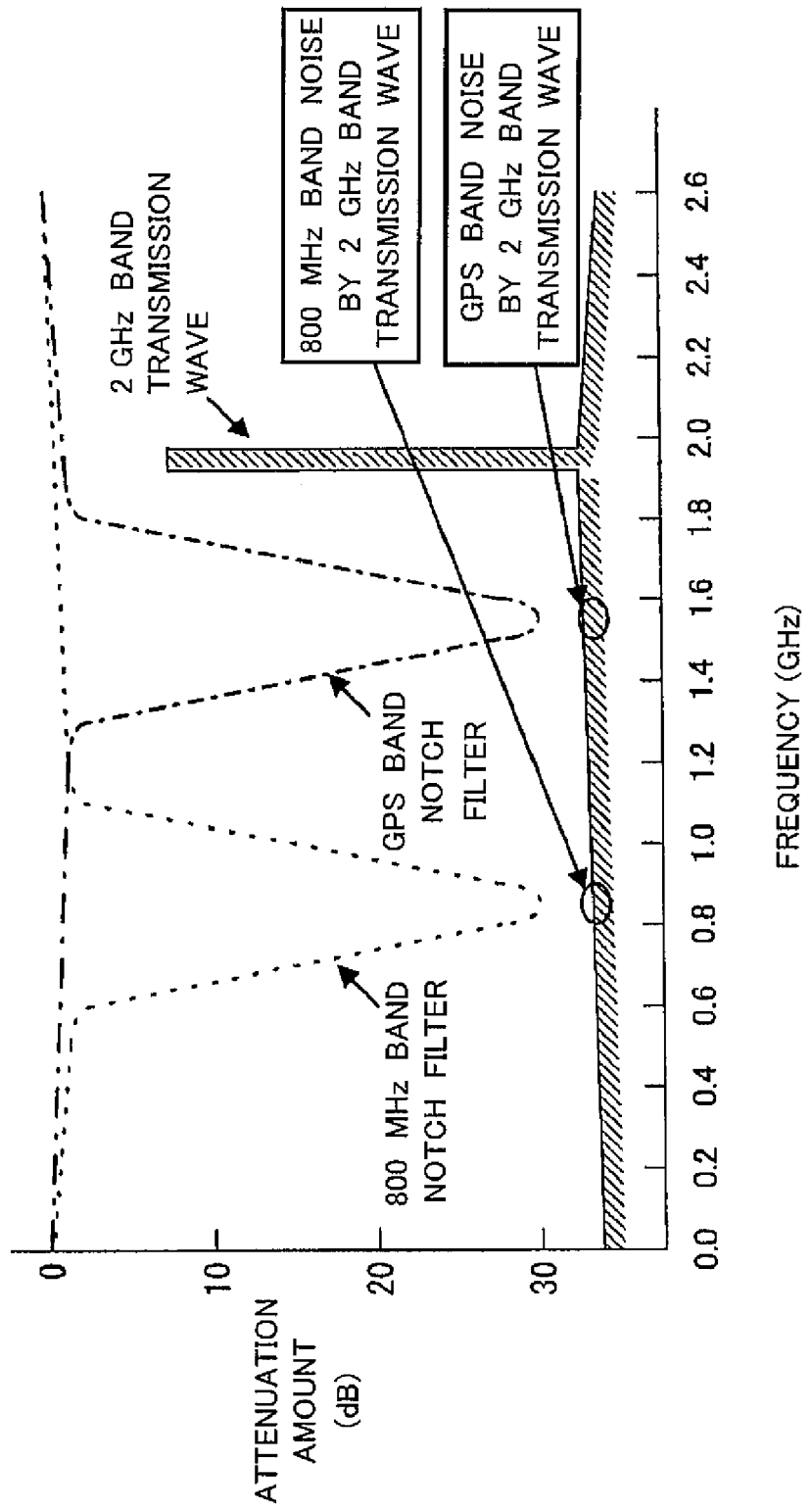
FIG. 9 is a diagram showing a second example of the characteristics of the attenuation filter according to the present embodiment.

Further, as shown in FIG. 9, the same can also be said for the case where the apparatus is operating in a hybrid mode where the data is received at the secondary receiver circuit of the 800 MHz band system simultaneously with call by the primary circuit of the 2 GHz band system and the case where the apparatus is operating in a hybrid mode where the data is received at the GPS receiver circuit simultaneously with call by the primary circuit of the 2 GHz band system.

In the former case, the connection switch 205 and the connection switch 206 are set to the off state under the control of the control circuit 207, and the connection switch 204 is turned on/off according to need.

In the latter case, by setting the connection switch 204 and the connection switch 205 to the off state under the control of the control circuit 207 and turning on/off the connection switch 206 according to need, the insertion loss of the circuit is reduced and accordingly the power consumption is reduced.

As explained above, according to the present embodiment, the filter 203 attenuating the GPS reception frequency can be shared by the 800 MHz band system and the 2 GHz band system, the insertion loss of the circuit can be reduced by on/off control of the antenna switch 119 by the control signal, and reduction of the price, reduction of the size, and reduction of the power consumption of the wireless communication device become possible.

Figure 1:
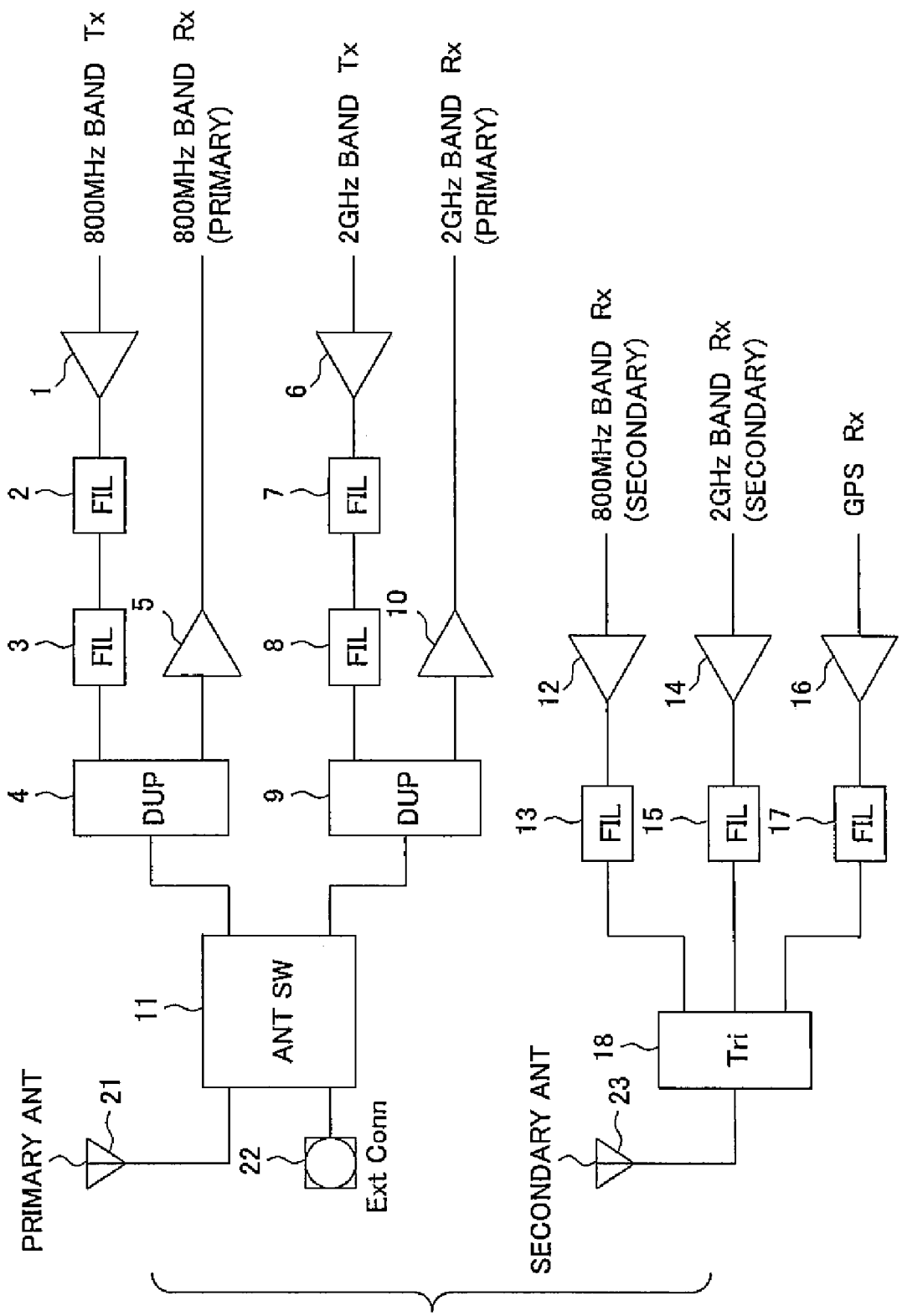
FIG. 1 is a block diagram showing an example of the configuration of a generally known wireless communication device.
Figure 2:
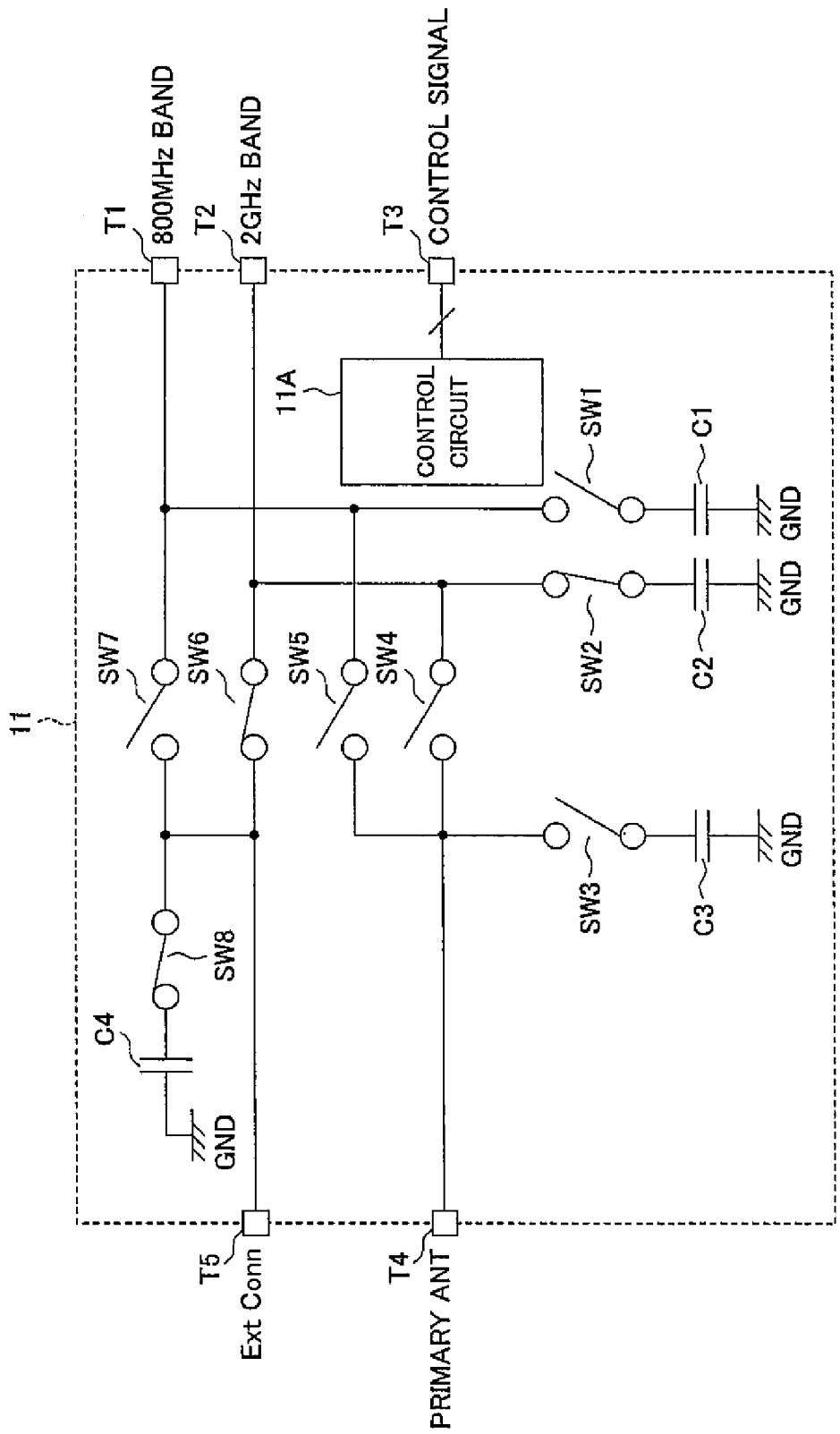
FIG. 2 is a diagram showing an example of the circuit of an antenna switch of FIG. 1.

Note that, as another embodiment, by connecting the attenuation filters 2, 3, 8, and 7 via the connection switch in the circuit configuration shown in FIG. 1 and performing control in the same way as the above description in accordance with the reception frequency of the secondary (sub) antenna, it becomes possible to reduce the insertion loss of the circuit.

INDUSTRIAL APPLICABILITY

A transmitter/receiver circuit and transmission/reception method of the present invention can reduce the insertion loss of the circuit at the time of a hybrid operation and is suitable for the reduction of the price, reduction of the size, and reduction of the power consumption, therefore can be applied to mobile phones and other wireless communication devices capable of hybrid operation among different frequency bands.

The invention claimed is:

1. A method for transmitting/receiving a plurality of signals having different frequency bands by using a main antenna capable of transmitting/receiving a plurality of signals having different frequency bands and a sub antenna capable of receiving a plurality of signals having different frequency bands, said method including:
    a first step of judging whether or not an operation mode is a hybrid mode of transmitting/receiving signals of two different frequency bands by using the main antenna and the sub antenna, and
    a second step of selecting a frequency band of the signal received at the sub antenna and attenuating the selected frequency band of the signal, in accordance with either a transmission signal output from or a reception signal at the main antenna, when the hybrid mode is detected.

2. A transmission/reception method as set forth in claim 1, wherein:
    in the second step, the frequency band of the signal received at the sub antenna is selected and the selected frequency band of the signal is attenuated, in accordance with a reception power of the main antenna.

3. A transmission/reception method as set forth in claim 1, wherein:
    in the second step, the frequency band of the signal received at the sub antenna is selected and the selected frequency band of the signal is attenuated, in accordance with a transmission power of the main antenna.

4. A transmission/reception method as set forth in claim 1, wherein:
    in the second step, a noise generated in a transmission/reception system connected to the main antenna is measured and, the frequency band of the signal received at the sub antenna is selected and the selected frequency band of the signal is attenuated, based on the measured value of the noise.

* * * * *